ROPE PULLER

Filed Dec. 4, 1948 9 Sheets-Sheet 1

INVENTOR.
PHILIP S. ARNOLD
BY
Burton & Parker
ATTORNEYS

Feb. 17, 1953 P. S. ARNOLD 2,628,813

ROPE PULLER

Filed Dec. 4, 1948 9 Sheets-Sheet 2

INVENTOR.
PHILIP S. ARNOLD
BY
Burton & Parker
ATTORNEYS

Feb. 17, 1953 P. S. ARNOLD 2,628,813

ROPE PULLER

Filed Dec. 4, 1948 9 Sheets-Sheet 3

INVENTOR.
PHILIP S. ARNOLD
BY
Burton & Parker
ATTORNEYS

Feb. 17, 1953 P. S. ARNOLD 2,628,813

ROPE PULLER

Filed Dec. 4, 1948 9 Sheets-Sheet 4

INVENTOR.
PHILIP S. ARNOLD
BY
Burton & Parker
ATTORNEYS

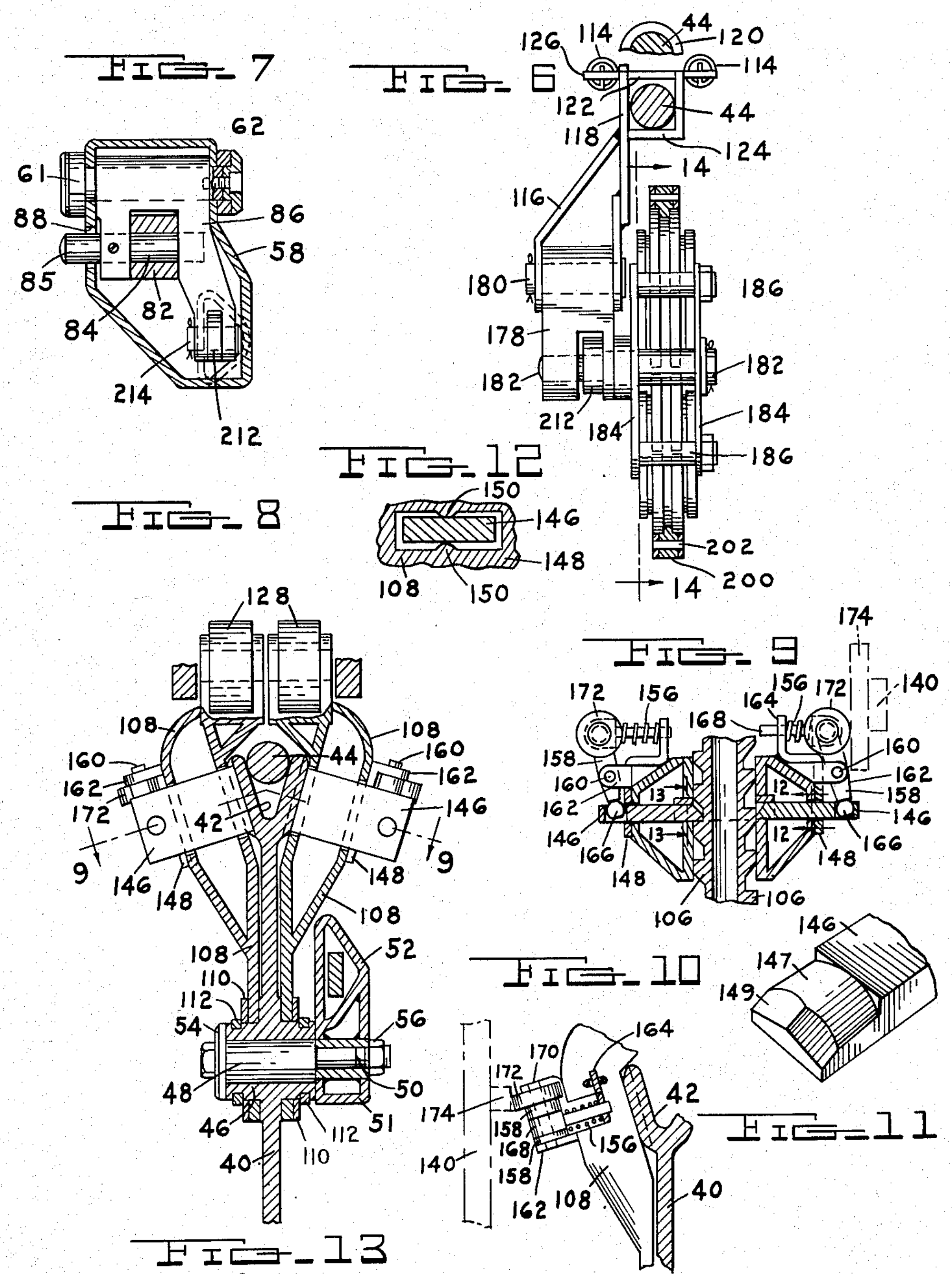
FIG. 6, FIG. 7, FIG. 8, FIG. 9, FIG. 10, FIG. 11, FIG. 12, FIG. 13
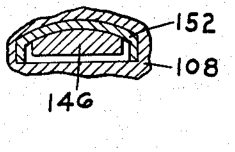
INVENTOR.
PHILIP S. ARNOLD
BY
Burton & Parker
ATTORNEYS Feb. 17, 1953 P. S. ARNOLD 2,628,813

ROPE PULLER

Filed Dec. 4, 1948 9 Sheets-Sheet 6

INVENTOR.
PHILIP S. ARNOLD
BY
Burton & Parker
ATTORNEYS

Feb. 17, 1953 P. S. ARNOLD 2,628,813
ROPE PULLER
Filed Dec. 4, 1948 9 Sheets-Sheet 7
FIG. 20
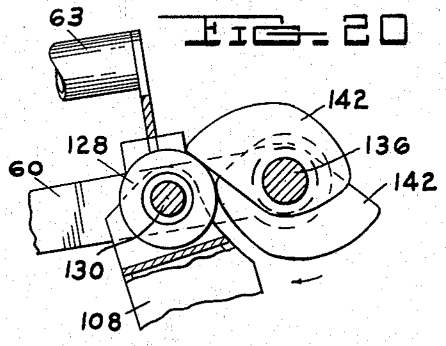
FIG. 18
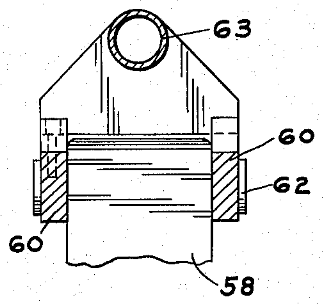
FIG. 19
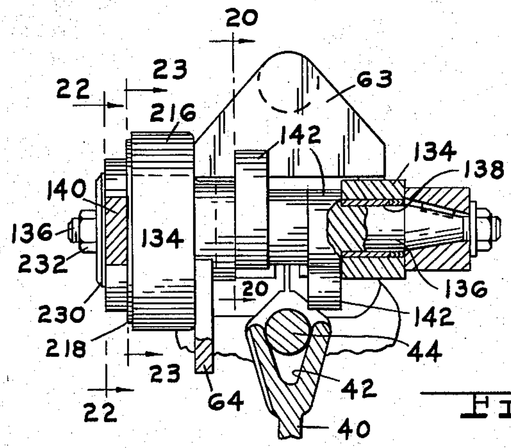
FIG. 25
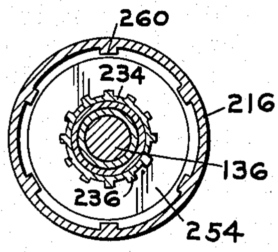
FIG. 21
FIG. 22
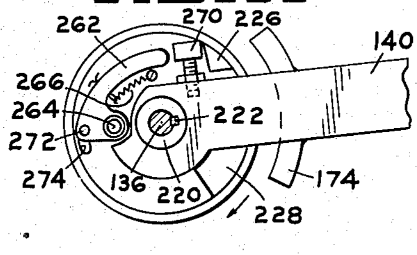
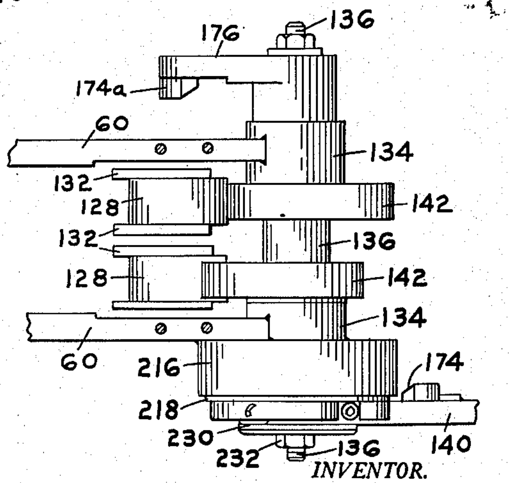
FIG. 23
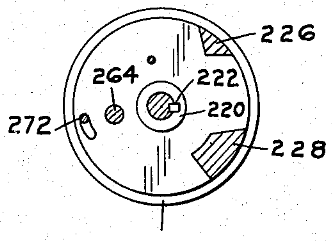
INVENTOR.
PHILIP S. ARNOLD
BY
Burton & Parker
ATTORNEYS Feb. 17, 1953 P. S. ARNOLD 2,628,813

ROPE PULLER

Filed Dec. 4, 1948 9 Sheets-Sheet 8

INVENTOR.

PHILIP S. ARNOLD

BY

Burton & Parker

ATTORNEYS

Feb. 17, 1953 P. S. ARNOLD 2,628,813

ROPE PULLER

Filed Dec. 4, 1948 9 Sheets-Sheet 9

INVENTOR.
PHILIP S. ARNOLD
BY
Burton & Parker
ATTORNEYS

Patented Feb. 17, 1953

2,628,813

UNITED STATES PATENT OFFICE 2,628,813

ROPE PULLER

Philip S. Arnold, Flint, Mich.

Application December 4, 1948, Serial No. 63,583

20 Claims. (Cl. 254—167)

This invention relates to improvements in rope pullers.

An object is to provide an improved rope puller of simple and compact construction and which is capable of being easily manually operated by one man to pull a rope to lift or advance a load to which the rope is attached.

This improved puller is of small size and light weight and can be readily moved by the user from one place to another for use. It can be readily anchored at and easily manually operated in any suitable location. It is highly effective and one man can easily manually apply to a rope being pulled sufficient force to move any load within the strength limits of the rope. It is designed to receive and advance ropes of varying size. One end of the rope is attached to a load and the opposite end of the rope may be left free. The puller is designed to be engaged with the rope at any point between the ends of the rope to advance the rope to lift the load.

One object is to provide a rope puller, which includes a pulley about which a rope can be passed to be advanced upon rotation of the pulley and which pulley has easily operable, manual crank actuated mechanism coupled therewith whereby the pulley can be rotated to feed a rope engaged thereover to advance or lift any load to which the rope is attached and which load is within the strength limits of the rope.

An important feature of the manually operable pulley rotating mechanism is that there is provided a crank rotated cam shaft having a pair of cams adapted upon rotation of the shaft to apply continuous torque to the pulley. Such cams are adapted to actuate a pair of reciprocably supported pawls to rotate the pulley. Such mechanism is adapted to apply a continuous torque to the pulley to actuate the same to lift a load or to smoothly resist the reverse rotation of the pulley under the weight of a load being lowered.

Another object is that simple brake mechanism is provided which is adapted to function instantly and automatically to maintain the pulley at any position to which rotated counter the load of the rope thereon. This brake mechanism responds instantly and automatically when the manual application of torque to the pulley from the crank is discontinued and the pulley comes under the influence of the load on the rope.

A meritorious feature of the construction is that the manually operable pulley rotating mechanism is so coupled with the brake mechanism that while the brake will take hold instantly to maintain the pulley at any position to which rotated in lifting a load, so as to thereby sustain the load, this coupling connection is such that when the handle is reversely rotated, as in lowering the load, the coupling connection functions to partially release the brake, thereby permitting the pulley to be reversely rotated under the torque of the weight of the load of the rope thereon. The construction is such that the load may be lowered in a controlled manner smoothly and easily. An advantage of this mechanism is that a load may be raised or lowered easily and smoothly and always under complete control of the operator.

Another meritorious feature of this construction is that only a single turn of the rope is necessary to be made about the pulley and yet the frictional engagement of the rope with the pulley is such that any load within the strength of the rope may be moved without undesirable slippage of the rope relative to the pulley. In this connection improved pressure shoe mechanism is employed to hold an arcuate portion of the turn of the rope about the pulley against the pulley so that the rope will travel with the pulley. An important feature of this pressure shoe mechanism is that it is designed to exert the required pressure upon the rope without exerting any abrading action or undesirable friction upon the rope. The pressure shoe mechanism is so constructed that its rope contacting portion travels with the rope while holding the rope against the pulley.

Another object of this invention is to provide a rope puller of the character described wherein the pressure shoe mechanism is caused to urge the rope against the pulley with a force which represents a proportionate part of the weight of the particular load being moved by the rope. Under light load a relatively light pressure is exerted by the pressure shoe mechanism holding the rope against the pulley. Under heavy load a relatively heavy pressure is exerted by the pressure shoe mechanism holding the rope against the pulley.

Another object is to provide a rope puller as herein set forth which includes a pulley over which a rope is passed and a crank coupled with the pulley to rotate it and anchor mechanism adapted to connect the puller to a suitable anchorage and adapted to permit swivelling of the anchor assembly with respect to the pulley when desired, but wherein the construction is such that when the pulley is under load undesired swivelling or wobbling of the pulley with respect to the anchor assembly is prevented.

Other objects, advantages and meritorious features will more fully appear from the following description, claims and accompanying drawings, wherein:

Fig. 6 is a fragmentary end view looking toward the pressure shoe mechanism and taken on the line 6—6 of Fig. 1;

Fig. 7 is a fragmentary end view taken from the opposite end of the puller as compared with Fig. 6 and on the line 7—7 of Fig. 1;

Fig. 8 is a sectional view through the pulley and the pulley shaft showing the pulley actuating pawls in elevation and taken on the line 8—8 of Fig. 1;

Fig. 9 is a fragmentary sectional view through a portion of the pulley and the pulley operating pawls taken on the line 9—9 of Fig. 8;

Fig. 10 is a fragmentary sectional view of a portion of the pawl controlling mechanism taken on the section line 10—10 of Fig. 1;

Fig. 11 is a perspective of a fragment of the pulley engaging end portion of a pawl;

Fig. 12 is a cross-sectional view through a pawl and a portion of the supporting arm taken on the section line 12—12 of Fig. 9;

Fig. 13 is a cross-sectional view through a pawl and its guide in the pawl supporting arm taken on the line 13—13 of Fig. 9;

Fig. 18 is a sectional view through the handle portion of the frame looking toward the anchor and taken on the section line 18—18 of Fig. 2;

Fig. 19 is a cross-sectional view taken on the line 19—19 of Fig. 1 looking toward the cam shaft;

Fig. 20 is a cross-sectional view taken on the line 20—20 of Fig. 19;

Fig. 21 is a top plan view of the cam crank shaft looking down on the line 21—21 of Fig. 1;

Fig. 22 is a fragmentary sectional elevation looking toward the brake and associated handle mechanism taken on the line 22—22 of Fig. 19;

Fig. 23 is a fragmentary sectional elevation looking toward the brake coverplate and taken on the line 23—23 of Fig. 19;

Fig. 25 is a transverse sectional view taken on the line 25—25 of Fig. 24;

This rope puller is a unitary structure which includes a pulley about which a rope is passed to be advanced to lift or move a load upon rotation of the pulley. Mechanism is provided to rotate the pulley. The rope is adapted to be secured to a load. The puller includes easily operable manual crank mechanism coupled with the pulley through rotating cam and pawl connections to rotate the pulley. The puller is supported from an anchorage and the anchor attachment means is designed to prevent undesirable swivelling of the puller under load. Pressure shoe mechanism is provided and so constructed that a portion of the weight of the load is transmitted to the pressure shoe to hold the rope against the pulley. Brake mechanism is also provided to maintain the pulley under load against reverse rotation. The entire puller assembly is believed to represent novel subject matter and the several features of the construction are also believed to be novel.

Briefly, my rope puller comprises a pulley and frame assembly, an anchor assembly at one end of the frame assembly adapted to be used to attach the puller to an anchorage, a crank and cam shaft assembly coupled with the pulley to rotate it, a pressure shoe assembly at the opposite end of the frame designed to hold a rope against the pulley for advancement thereby, and a brake assembly adapted to maintain the pulley at any position to which rotated against the weight of the load on the rope.

*Pulley and frame assembly*

Figure 5:
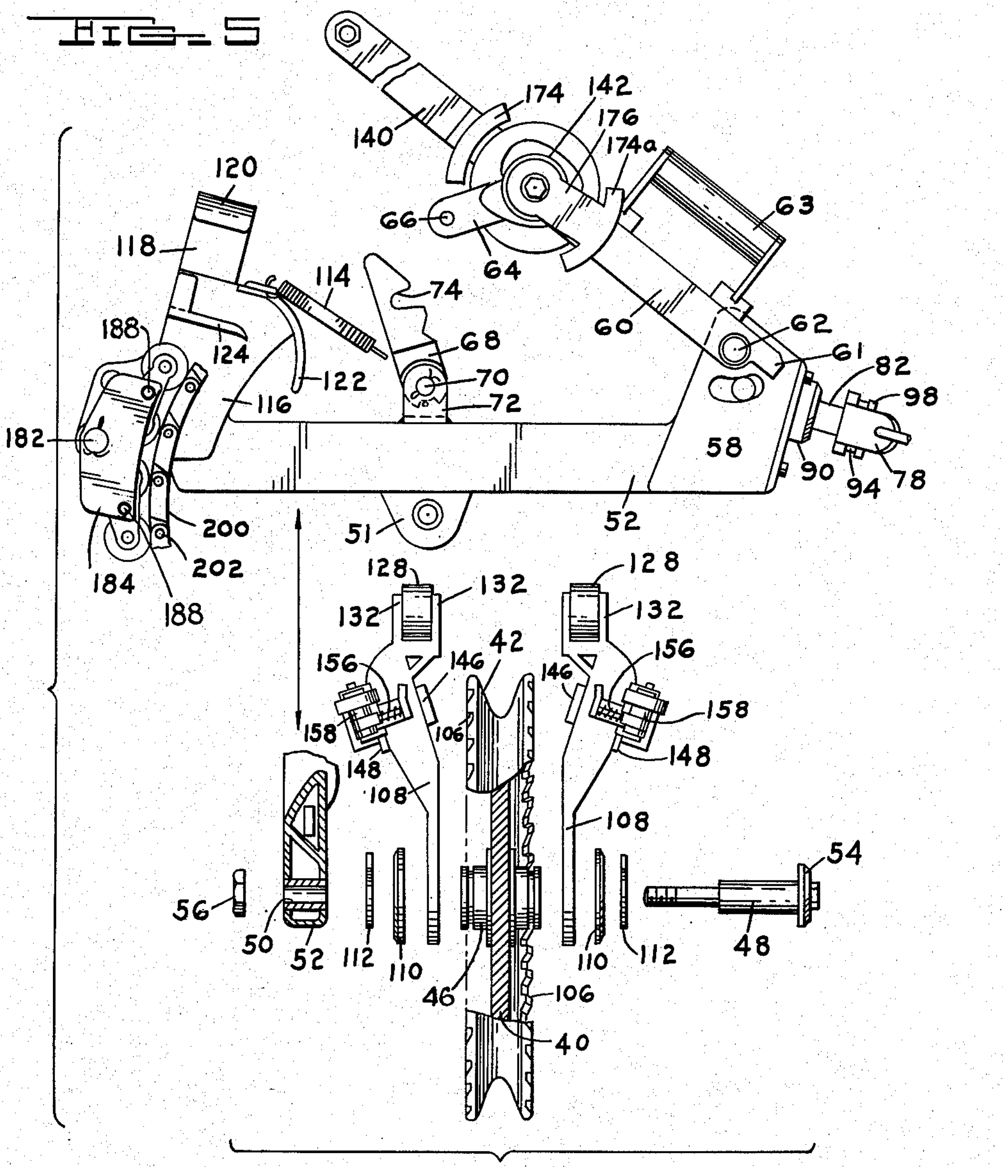
Fig. 5 is an exploded view showing the pulley and its operating pawls separated and the frame structure detached therefrom and opened up.

This rope puller comprises a pulley 40 having a periphery which exhibits a V-groove 42 in which a rope 44 may be received to be advanced upon rotation of the pulley. The V-groove is so shaped that ropes of different diameters may be received and gripped therein to be advanced upon rotation of the pulley. This pulley is provided with a hub 46 journalled upon a shaft 48 for rotation of the pulley about the shaft. The shaft is supported by a hollow frame member 52. This frame member is provided with a depending lug 51 which lug carries a bushing 50 within which the shaft 48 is mounted as shown in Figs. 5 and 8. One end of the shaft is provided with a head 54. It abuts one end of the pulley hub as shown in Fig. 8. The opposite end of the shaft is threaded and is of reduced diameter and extends through the bushing 50. A nut 56 is threaded as shown in Figs. 5 and 8 upon the shaft. The hollow frame member 52 also serves as a housing for tension transmitting linkage hereinafter described.

Figure 1:
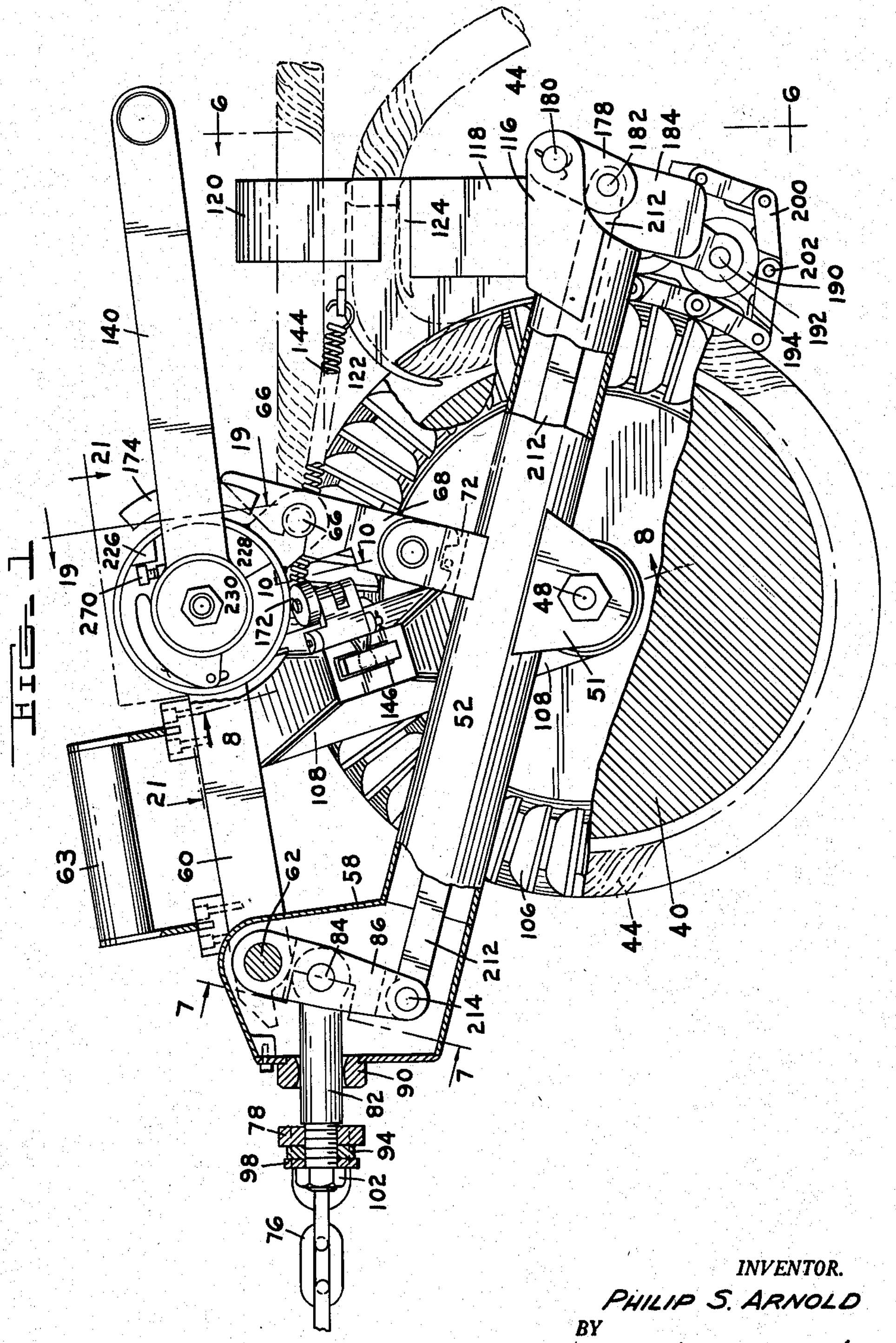
Fig. 1 is a side elevation of the rope puller in operative position showing portions of the frame cut-away to expose the anchor attachment and tension linkage in section and elevation.
Figure 2:
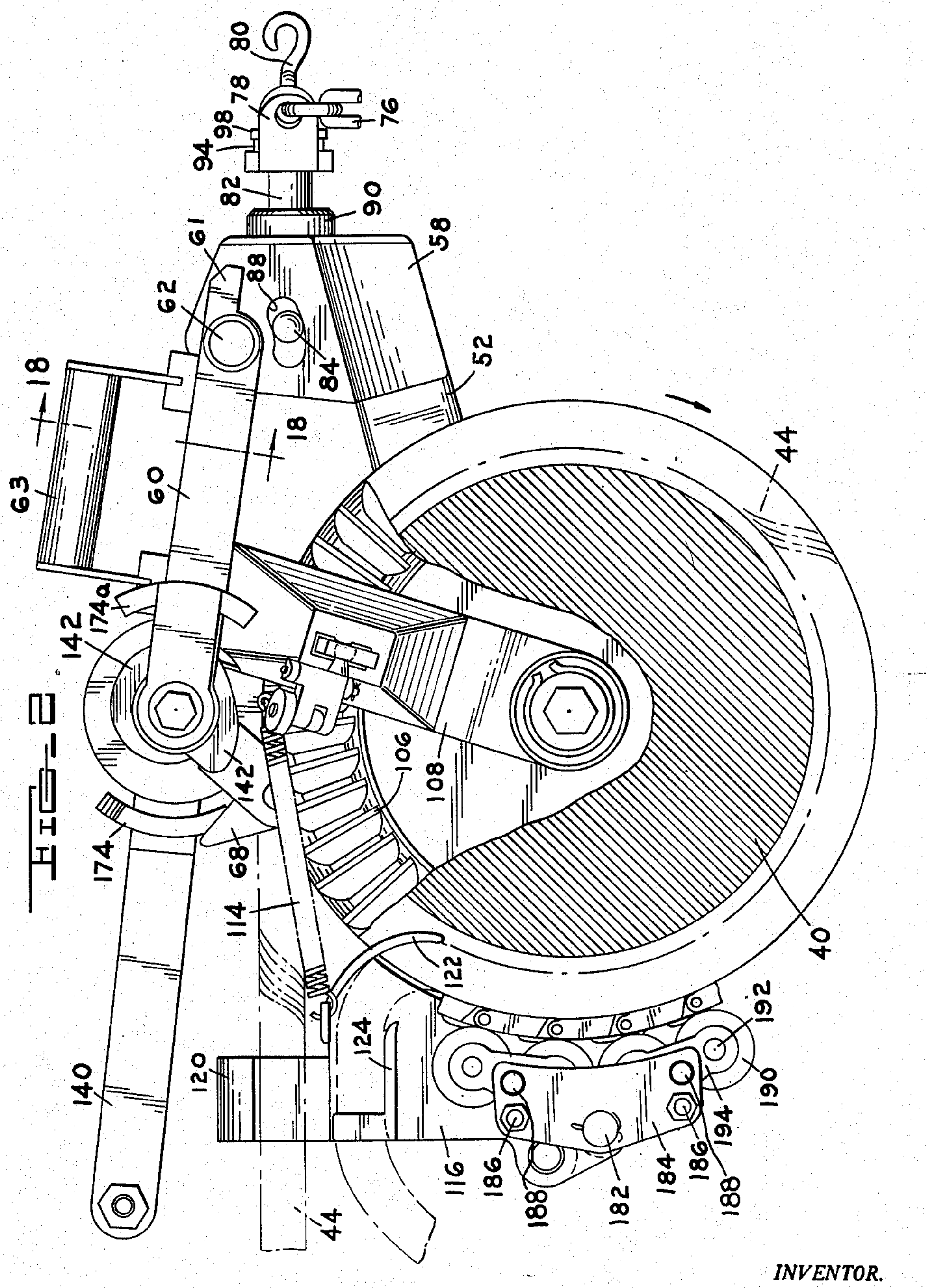
Fig. 2 is a side elevation of the rope puller in operative position taken from the side opposite to that of Fig. 1.

The frame member 52 is provided at one end with an upwardly extending hollow head portion 58. The anchor assembly is attached to this front end of the frame. At the opposite end of the frame the pressure shoe assembly is mounted. A second frame portion, which includes a pair of parallel links or bars 60 (Figs. 1 and 18), is swingably supported upon a pivot pin 62 carried by the hollow head 58. This swingable frame portion is provided with a handle part 63 (Figs. 2 and 18), which handle part is carried by and connects the two bars 60 and serves as a torque member to prevent misalignment of the two bar bearings due to cam forces. This swingable frame portion is adapted to be swung from the closed position as shown in Figs. 1 and 2 to the open position as shown in Fig. 3 and vice versa.

Figures 3, 4:
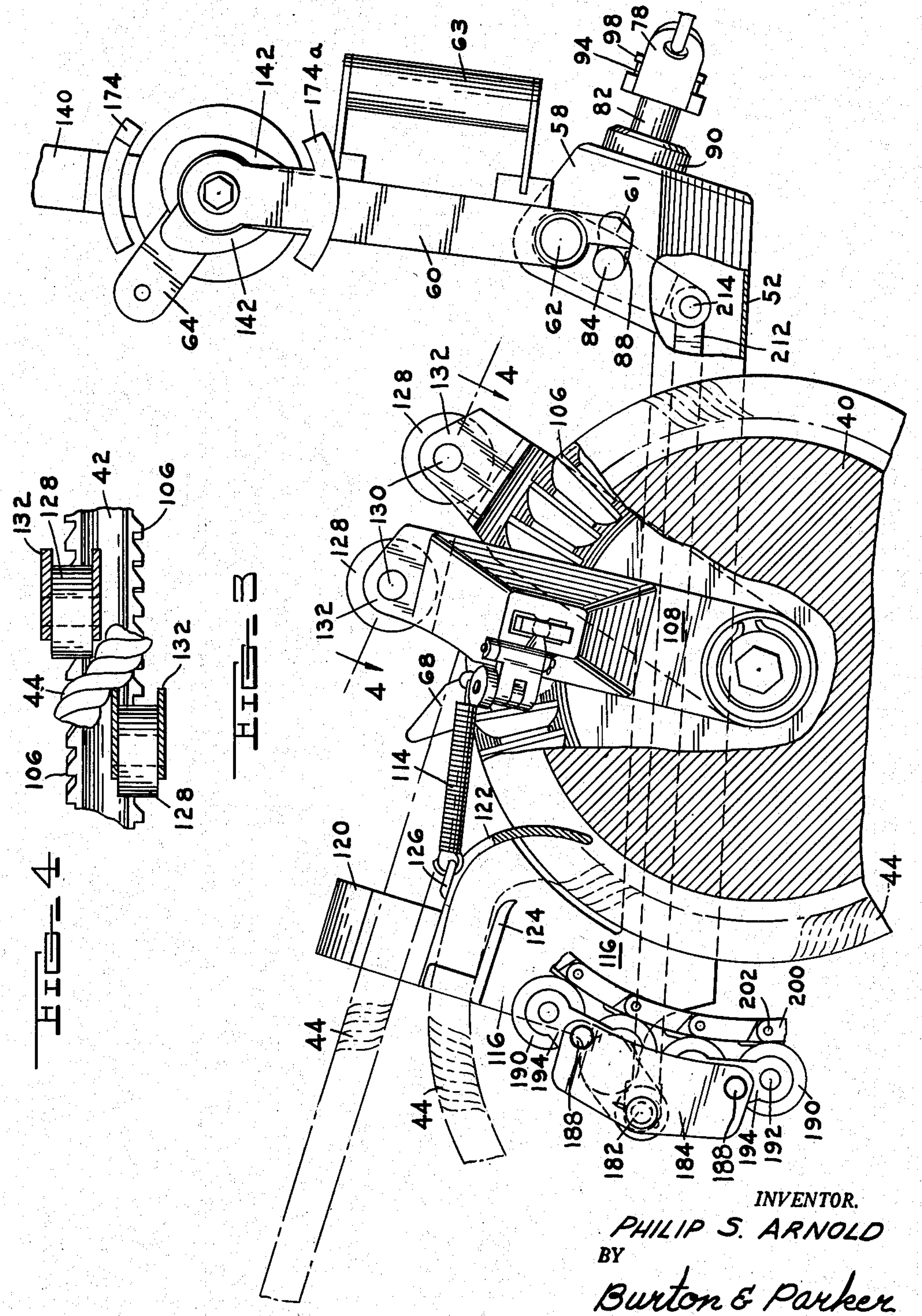
Fig. 3 is a side elevation of the rope puller taken from the same side as Fig. 2 showing the crank cam shaft portion of the frame swung open to permit insertion of a rope about the pulley.
Fig. 4 is a fragmentary sectional view, partly in plan, taken on the section line 4—4 of Fig. 3.

When the swingable frame portion is opened up through being swung upwardly as shown in Fig. 3, the pressure shoe mechanism is moved away from the pulley as also shown in such figure. In such open position a rope may be threaded into the V-groove of the pulley. This is illustrated also in Fig. 4. After a rope has been placed about the pulley, the swingable portion of the frame may be lowered to the closed position shown in Figs. 1 and 2 and may be locked at such position.

To lock the swingable portion of the frame in the closed position, such swingable portion is provided at the rear end with a fixed depending arm 64. This arm carries a stud 66. A cooperating arm 68 is pivoted at 70 to an upright lug 72 on an intermediate portion of the frame member 52. Note Fig. 5. This arm 68 is adapted to be swung about its pivot 70. Such arm 68 is provided with a notch 74. The notch 74 is adapted to be received over the stud 66 to lock the upper swingable frame portion to the lower frame member 52 as shown in Fig. 1. At the front end of the frame assembly is the anchor mechanism. At the rear end of the frame assembly is the pressure shoe mechanism.

*Anchor assembly*

At the forward end of the frame, there is an anchor assembly whereby the puller may be attached as a unit to a suitable anchorage. This anchor assembly is shown more particularly in Figs. 1, 2 and 17. The anchor assembly is designed to permit free swivelling of the puller when not in use relative to the anchorage. It is also designed to frictionally resist swivelling of the puller with respect to the anchorage when the puller is under load. The anchor assembly includes friction plates which are held in engagement by the load on the puller to resist any swivelling under load.

There is an anchor chain 76 attached to one end of a yoke 78. This chain is adapted to be passed about a suitable anchorage. A grab hook 80 is attached to the opposite end of the yoke. This grab hook is adapted to be engaged with the chain. This yoke 78 is mounted upon an anchor stud 82. This stud 82 is pivoted upon a pin 84. This pin is carried by the forked portion of a lever 86 as shown in Figs. 1 and 7. This lever is disposed within the hollow head 58 at the front end of frame member 52. This lever 86 is pivotally supported at its upper end upon a stationary pivot 62. Upon this pivot 62 the swingable frame bars 60 are also pivoted as heretofore described.

The pivot pin 84 has an end portion which projects as at 85 through a slot 88 in the side wall of the head 58 as shown in Figs. 3 and 7. This projecting end 85 of the pin is adapted to be picked up by the projecting end 61 of a frame bar 60 when the upper portion of the frame is swung to an open position as shown in Fig. 3 for a purpose hereinafter set forth.

Figures 15, 17:
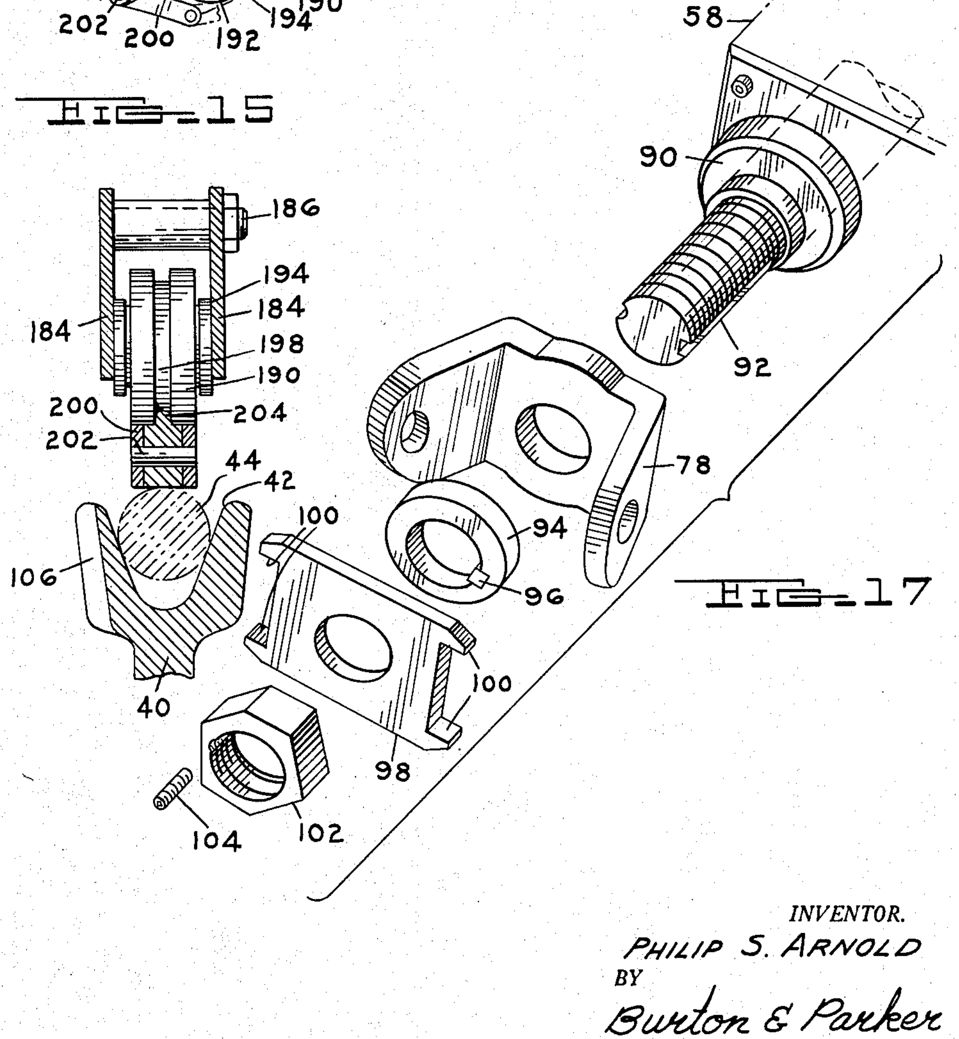
Fig. 15 is a transverse sectional view taken on the line 15—15 of Fig. 14.
Fig. 17 is an exploded view of the anchor attachment assembly.

The anchor stud 82 extends freely through a bearing plate 90 fixed in the front end of the head 58. Such stud has limited rockable movement within the bearing as shown in Figs. 1 and 17. The outer end of the stud is threaded and is of reduced diameter. The base of the yoke 78 is freely journalled upon the stud and bears against the enlarged diameter portion of the stud as shown in Fig. 1.

The outer end of the threaded portion of the stud is slotted lengthwise as at 92. A friction ring 94 provided with a key 96 is freely received over the threaded end of the stud. The key 96 is received within the key-way 92 of the stud. This ring is, therefore, shiftable lengthwise over the stud but is held against rotation thereabout. A yoke engaging friction plate 98 is freely receivable over the threaded end of the stud as illustrated in Figs. 1 and 17. This plate is capable of both rotation about the stud and shiftable movement lengthwise thereover. The opposite ends of the plate 98 are forked as at 100 to engage over the sides of the yoke 78 so that the plate is held to the yoke 78 against relative rotation, but is rotatable with the yoke about the stud. A nut 102 is adapted to be threaded upon the end of the stud and secured thereon by a lock screw 104.

It will be seen that when the puller is under load, such load is transmitted to the anchorage to which the chain 76 is connected through this anchor stud and yoke assembly. The friction ring 94 is frictionally gripped between the base of the yoke 78 and the yoke plate 98. Rotation of the stud and puller assembly relative to the anchorage and yoke is thereby frictionally resisted in proportion to the load. Upon release of the load, however, the puller and anchor stud may be readily swivelled through this anchor assembly relative to the yoke. Due to the torque improsed upon the pulley by a manually rotatable crank, offset laterally to one side of the pulley as hereinafter described, this characteristic of resisting swivelling under load is important.

*Crank and cam shaft assembly*

The pulley 40 is adapted to be manually rotated by a crank and cam shaft assembly through a pair of cams which act upon a pair of pawl arms which arms carry pawls that successively pick up the pulley to rotate it. It will be observed that the pulley is provided on both sides with circumferentially arranged ratchet teeth 106. These teeth are adapted to be engaged as hereinafter described by pawl members. A pair of similar pawl carrying arms 108 are journalled upon the hub 46 of the pulley, one upon each side thereof, as shown particularly in Fig. 8. Each arm is journalled upon the hub and is held in position by a bearing plate 110 which in turn is held in position by a lock ring 112.

Each pawl arm is held normally rearwardly by a tension spring 114 attached at one end to the arm and attached at the opposite end to the pressure shoe supporting bracket 116. This bracket 116 is fixed to the rear end of the frame member 52 as shown in Figs. 1, 5 and 6. It supports a pressure shoe assembly hereinafter described. This bracket is here shown as forked and the two ends of the fork are secured to the two sides of the frame member 52 as shown. This hollow forked portion may be welded or otherwise secured to the hollow frame member 52.

This bracket 116 has an upwardly extending part 118 which part defines passageways or guides through which both ends of the rope 44, which extends around the pulley, pass as shown in Figs. 2, 3 and 6. This upwardly extending part 118 is curved over at its upper end as at 120. Immediately below such curved upper end is the passageway for the upper portion of the rope. This upper passageway for the rope is separated from the lower passageway therebelow by a stationary curved plate 122 (Figs. 3 and 5). The upper end of the rope extends outwardly above this curved plate. The lower end of the rope extends outwardly below this curved plate. This curved plate 122 has one end portion which enters the V-groove in the pulley as shown in Fig. 3. Such end of the plate serves to guide the end of the rope to travel thereunder through the lower rope passageway. The bottom wall of the lower rope passageway is established by a stationary plate 124 fixed to the bracket as shown in Figs. 3 and 6.

The tension springs 114 which are connected with the pawl arms 108 and hold these arms yieldingly rearwardly are connected at their rear ends to side ears 126 on the curved plate 122 as shown in Figs. 3 and 6.

Each arm is provided at its upper end with a roller 128 (Figs. 3 and 5). Each roller is journalled upon a fixed pivot 130 within the forked upper end 132 of the pawl arm (Fig. 5). These rollers are thrust rollers which take the thrust of the rotating cams to swing the arms forwardly against the tension of the springs 114. Each arm carries a pawl which is adapted to engage a ratchet tooth to advance the pulley 40 in a manner hereinafter described.

Generally speaking, the crank and cam shaft is an assembly carried by the upper swingable frame 60 as shown in Figs. 3, 5, 19 and 21. The two parallel bar portions 60 of this swingable upper frame portion are provided at their rear ends with supporting bearing portions 134, Figs. 19 and 21. A crank and cam shaft 136 is journalled within these end bearings and extends therebeyond at each end. A bearing member proper 138 may be provided as shown in Fig. 19. A handle or crank 140 is provided to rotate this shaft. The coupling engagement of this handle with the shaft will be more particularly described in connection with the description of the brake mechanism hereinafter set forth, but generally this coupling engagement is such that the shaft is adapted to be rotated upon manual rotation of the handle.

This shaft is provided with a pair of cams 142. These cams are disposed in axially spaced apart relationship upon the shaft. These cams are so spaced as to engage the rollers 128 mounted on the two pawl arms 108. These cams are so relatively contoured, as shown particularly in Figs. 19, 20 and 21, that when the roller 128 of one swingable arm is being engaged by the high side of its cam to swing such arm forwardly against the tension of its spring 114, the roller 128 of the other arm is in engagement with the low side of its cam thereby permitting the return swinging of such arm by its spring 114. It is apparent, therefore, that the arms 108 are swung forwardly in succession. As one arm is swung forwardly the other arm is permitted to be returned rearwardly under the impulse of its spring 114. There is a permitted overlapping of movement so that the pulley 40 is maintained under constant torque (note Fig. 20), but generally speaking, as one arm is swung forwardly to drive the pulley, the other arm returns rearwardly to its starting position. Each cam preferably exhibits on its high side a constant rise and the constant rise portions of the two cams overlap so that the pulley is urged forwardly by a constant uniform force. The functioning is such that the pulley is constantly under driving torque from the two pawls 146 but such pawls exercise driving torque successively. With this type of construction it is possible to develop exceedingly high driving torque with relatively small effort of the operator applied to the handle.

Each arm is provided with pawl mechanism adapted to pick up the adjacent ratchet teeth of the pulley 40 to advance the rotation of the pulley as the pawl arm is swung forwardly by its cam. When the pawl arm is returned rearwardly by its spring 114, the pawl returns rearwardly over the ratchet teeth to pick up another tooth on its next forward swing. The pawls of the two arms are similar. Such pawl construction is shown particularly in Figs. 8 through 11 and Fig. 5.

The upper end of each arm is enlarged and hollow as shown. A pawl 146 is slidably supported within the upper end of each arm to move transversely thereof in and out with respect to the pulley as the arm is swung. Such pawl is slidably supported for transverse travel through both side walls of the arm. It is supported to have a permitted freedom of rockable movement through the side walls of the arm so as to facilitate engagement of the pawl with the ratchet teeth.

There is secured to the outer wall of each arm a plate 148 shown in section in Figs. 9 and 12. This plate is provided with an opening through which the pawl slides. The opposite margins of the opening through the plate are provided with bearing points 150 which support the pawl in such a manner as to permit rockable movement of the pawl as shown particularly in Fig. 12. The inner wall of the arm is provided with a guide 152 through which the pawl 146 is adapted to freely slide. Such structure is shown in Figs. 9 and 13. Such guide is slightly oversize the pawl to permit free rockable movement thereof.

The ratchet engaging end of the pawl is shaped to easily engage the ratchet teeth as shown in Fig. 11. There is an arcuate end portion 147 which is beveled at its extremity as at 149 to engage easily within the tooth ratchet of the pulley. The forward drive of the pulley is counter-clockwise as shown in Fig. 1 and clockwise as shown in Fig. 2 all in the direction of the arrows. The flat face of the end of the pawl abuts against the flat face of a tooth of the ratchet to drive the pulley forwardly. In the rearward swing of the pawl arm, the beveled face 149 of the pawl passes over the beveled face of the ratchet teeth.

Each pawl is held normally inwardly under spring pressure to engage the adjacent ratchet teeth of the pulley. Each pawl is adapted to be swung outwardly against the tension of its spring by mechanism controlled by the rotation of the crank cam shaft. Each pawl is shown as held inwardly under the yielding spring tension of spring 156. Such spring acts upon one end of a pawl actuating lever 158. This pawl actuating lever is pivoted at 160 upon a lug 162 formed on an extension of the plate 148. Such plate is extended to form the bracket portion 164 as shown in Fig. 9. This bracket portion is welded or otherwise secured to the pawl arm. This bracket portion is provided with the outwardly bent lug 162 heretofore described.

One end of the lever 158 is provided with a ball 166. This ball is disposed within an aperture formed in the outer end of the pawl 146 as shown particularly in Fig. 9. The spring 156 acts upon the opposite end of the lever to swing the lever about its pivot 160 to urge the pawl 146 inwardly toward the pulley. The spring 156 is supported upon a stud 168. This stud is pivotally mounted at the outer end of the lever 158. One end of the spring bears against the stationary bracket 164. The stud is slidable through an opening in the bracket as shown in Fig. 9.

Such lever is forked at the stud carrying end as shown in Fig. 10 to pivotally support the stud. A pivot 170 is mounted in the forked end of the lever upon which the stud is journalled. Not only is the stud 168 journalled upon this pivot pin 170, but a roller 172 is also journalled upon this pivot pin. This roller 172 is adapted to be engaged by a cam 174 and urged inwardly to swing the lever 158 against the tension of spring 156 to shift the pawl 146 outwardly as shown adjacent to the margin of the sheet in Fig. 9.

The cam identified by numeral 174 is a cam mounted upon the manually operable handle 140 (Figs. 9, 10 and 21). Such cam is adapted to engage the adjacent roller 172 once during each revolution of the handle. At the opposite end of the crank and cam shaft 136 from the handle end there is mounted an arm 176 which rotates with the shaft. This arm 176 carries a cam 174*a* which cam is similar to the cam 174 as shown in Fig. 21. This cam is adapted to engage its roller 172 once during each revolution of the shaft.

These two cams 174 and 174*a* are similarly formed and are so relatively disposed radially with respect to the axis of the shaft 136 that when the cam 174 is urged against its roller 172 to move the pawl 146 out of engagement with the adjacent ratchet teeth of the pulley, the cam 174*a* is travelling through an arc of rotation free from engagement with its roller 172. The two cams, therefore, engage their rollers in succession to move the pawls alternately and in coordination with the rotation of the cam shaft 136.

In the forward direction of rotation of the pulley, the two pawls 146 are adapted to normally ride over the sloping faces of the ratchet teeth 106 of the pulley as the pawls move rearwardly relative to the forward direction of rotation of the pulley. In the reverse direction of rotation of the pulley, the pawls would not so freely ride and, therefore, in this reverse direction of rotation it is necessary that some positive means be provided to lift the pawls out of engagement with the ratchet teeth of the pulley. This positive means is provided by the cams 174 and 174*a* which function as above described at predetermined points in the rotation of the crank. These cams 174 and 174*a* function to positively move the pawls out of engagement with the ratchet teeth of the pulley. Such cams, of course, function to accomplish this purpose whether the direction of rotation of the pulley is in the forward direction or in the reverse direction.

*Pressure shoe assembly*

In this type of rope puller, it is desirable to have a construction wherein ropes which vary somewhat in diameter may be employed. The rope is passed about the pulley only once. As illustrated, the two ends of the rope extend outwardly from the frame through the guide bracket as heretofore described and as shown in Figs. 1 and 2. One end of the rope will be attached to a load to move or lift the load. To insure effectiveness of operation, it is necessary that the rope be so engaged within the V-groove of the pulley that it will be advanced by the pulley without undesirable slippage. It is further desirable that the rope be so engaged with the pulley as not to wedge within the V-groove to such an extent as would appreciably abrade or deteriorate the rope or prevent its removal from the groove.

In the attainment of these ends, I provide pressure mechanism which functions to hold the rope within the V-groove of the pulley so that the rope travels with the pulley without undue slippage and without undue wear thereon. My pressure shoe mechanism is so constructed and assembled with respect to the entire puller assembly that a proportionate part of the weight of the load upon the pulley is transmitted from the anchorage to the pressure shoe mechanism to hold it to urge the rope within the pulley groove.

Figure 14:
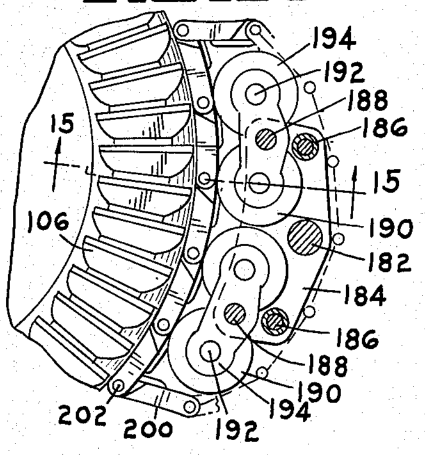
Fig. 14 is an elevation of a fragment of the pulley and the pressure shoe mechanism taken on the line 14—14 of Fig. 6.
Figure 16:
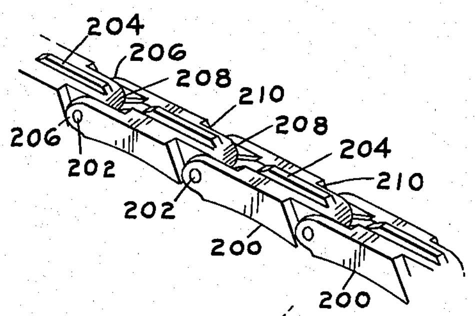
Fig. 16 is a perspective of a fragment of the endless chain of the pressure shoe mechanism.

My pressure shoe assembly is pivotally supported upon the brackets 116 at the rear end of the frame. A lever 178 is pivoted to the bracket 116 by a pivot pin 180. This is shown particularly in Fig. 6. This lever is provided at its free end with a pivot pin 182. The pivot pin 182 extends at one end beyond the lever and upon this projecting end of the pin there is journalled the pressure shoe mechanism proper. This pressure shoe mechanism proper consists of a pair of parallel similar frame plates 184 held in spaced apart relationship by spacers and bolts 186 (Fig. 6). Between these frame plates 184 are freely pivotally supported two two-wheel trucks. These two trucks are similar. One truck is journalled at one end of the frame 184 upon trunnions 188 (Fig. 14), one trunnion for each plate 184 and the adjacent truck frame plate 194 of the truck. The other truck is similarly journalled at the opposite end of the frame 184 upon two similar trunnions 188. Each truck carries a pair of rollers. An endless chain is supported upon these rollers to travel thereover.

Each two-wheel truck consists of two rollers 190 pivotally supported upon axles 192 between a pair of truck frame plates 194. The ends of the axles may be turned over to maintain the truck frame plates in spaced apart relationship. Each two-wheel truck is capable of swinging motion upon its pivotal supports 188.

Figure 32:
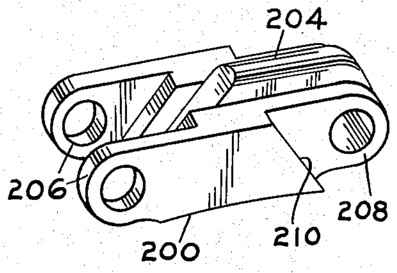
Fig. 32 is a perspective of one of the chain links.

The trucks are so supported and constructed that an endless chain is supported to travel over the rollers and this chain is capable of assuming an arcuate curvature which conforms with the periphery of the pulley 140. Each roller 190 is provided with a circumferential median groove or channel 198 (Fig. 15). The endless chain is composed of a succession of individual links 200 pivotally connected together by pivot pins 202. Each link is shaped as shown in Fig. 32. Each link has a bottom face which is arcuate lengthwise to conform with the curvature of the rope about the pulley and flat transversely to bear smoothly thereon. Each link is provided on its opposite face with a median lengthwise extending ridge 204 adapted to be received within the groove 198 of the rollers 190, as shown in Fig. 15. This engagement of the ridge 204 with the grooves 198 of the rollers holds the chain to travel in a determined line over the rollers.

Each link is forked at one end as at 206. Each link is provided at its opposite end with a tongue portion 208. The tongue portion 208 of one link is adapted to be received between the forks 206 of a succeeding link. The pivot pins 202 extend through the interengaged tongue and forks of adjacent links to pivotally connect the links together. The links are cut-away, as shown at 210, so that the chain can freely bend to conform with the curvature of the pulley. The dimensions of the links are such with respect to the mounting of the rollers that each roller is always holding one link against the rope. The dimensions of the links and their pivotal connections are such as compared with the spacing of the pivot mountings of the rollers that the links are held by the rollers against the rope uniformly and with constant pressure throughout that arcuate length of the rope engaged by the chain. The links are so formed on their undersurface that throughout the succession of links held against the rope there is smooth and substantially continuous engagement of the links with the rope. This is important.

To hold the pressure shoe mechanism against the rope and urge it within the V-groove of the pulley, there is a connecting bar 212 which is pivotally journalled at its rear end upon a pin 182 and pivotally journalled at its front end upon the lower end of the lever 86 by a pivot 214. This bear as here shown extends through the hollow frame member 52. It is shown particularly in Figs. 1 and 3.

When the puller is under load, a proportion of the weight of the load is transmitted from the anchorage assembly through the bar 212 to the pivot mounting 182 at the free end of link 178 so as to draw the pressure shoe mechanism against the rope. When it is desired to place a rope about the pulley, the swingable portion of the frame is opened up as shown in Fig. 3. When the swingable portion of the frame is opened to the extent shown in Fig. 3, the extension 61 engages the projecting end of the pivot pin 84 and swings the lower end of the lever 86 rearwardly. This movement of the lower end of the lever rearwardly transmits thrust through the link 212 to the pivot pin 182 and swings lever 178 rearwardly. This swinging of the lever 178 rearwardly moves the pressure shoe assembly rearwardly and away from the pulley as shown in Fig. 3 to permit insertion of the rope.

*Brake mechanism*

It was hereinabove stated that in the description of the brake mechanism the driving connection of the handle 140 with the cam shaft 136 would be described. Such handle is so coupled with the shaft as to be capable of rotating the shaft. The crank cam shaft is journalled as heretofore set forth within bearings formed in the rear ends of the two parallel frame arms 60 of the upper swingable portion of the frame. The rear end of one of these arms is provided with a bracket 64 which carries a stud 66 which stud is adapted to be engaged within the notch 74 of the swinging arm 68 to lock the two parts of the frame together as hereinabove set forth. To this same end portion and bracket 64 there is fixed a stationary brake drum 216. These brake parts and the connection thereof with the shaft are shown more particularly in Figs. 21 through 31.

Figures 24, 26, 27, 28, 30:
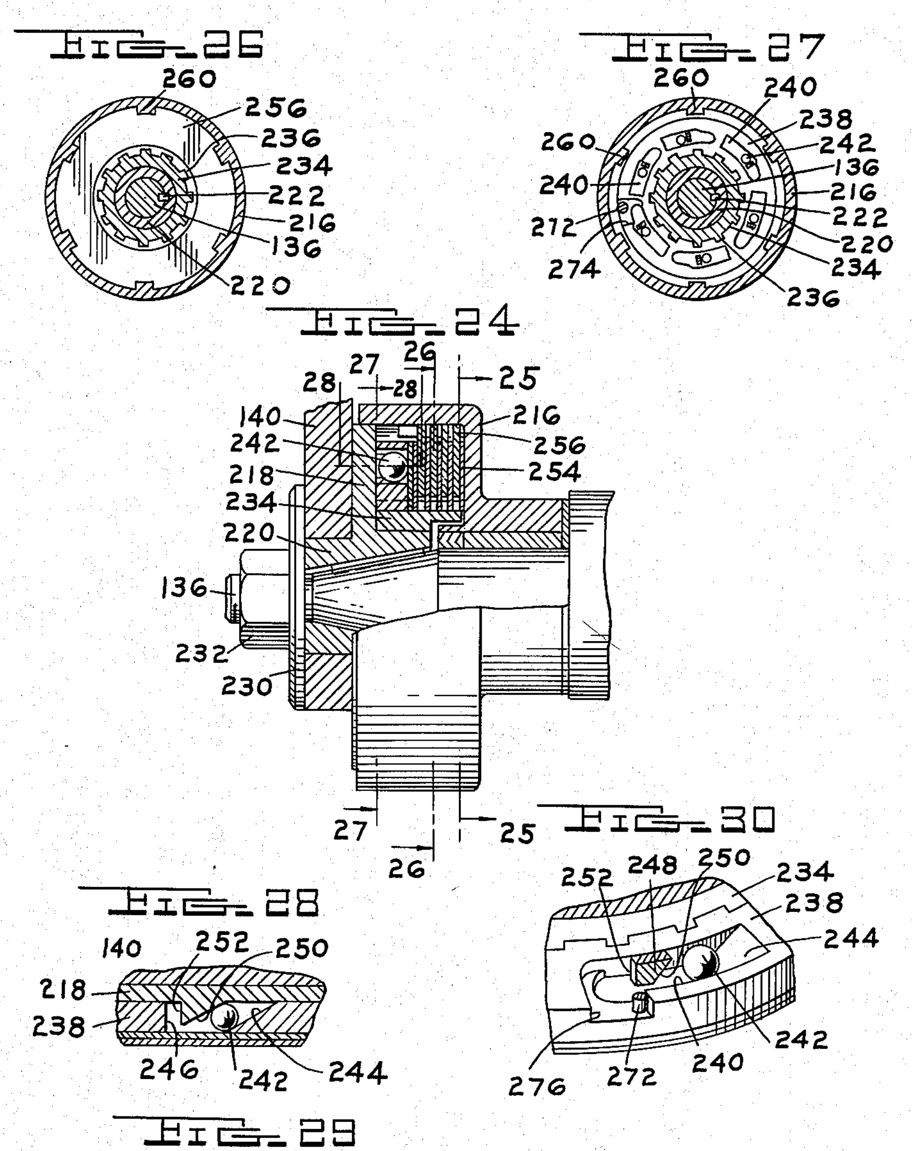
Fig. 24 is an elevation, partly in section, of a portion of the crank cam shaft showing the associated brake mechanism in section.
Fig. 26 is a transverse sectional view taken on the line 26—26 of Fig. 24.
Fig. 27 is a cross-sectional view taken on the line 27—27 of Fig. 24.
Fig. 28 is a fragmentary sectional view taken on the section line 28—28 of Fig. 24.
Fig. 30 is a perspective of a fragment of the ball carrier plate shown also in Figs. 27 and 31.
Figure 29:
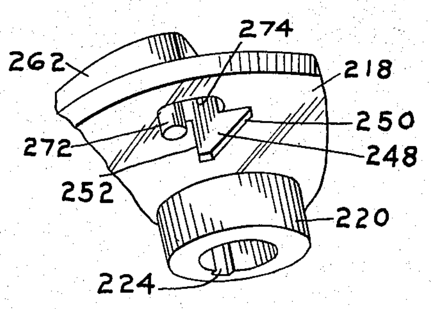
Fig. 29 is a perspective of a fragment of the brake coverplate taken from the inside of the coverplate.
Figure 31:
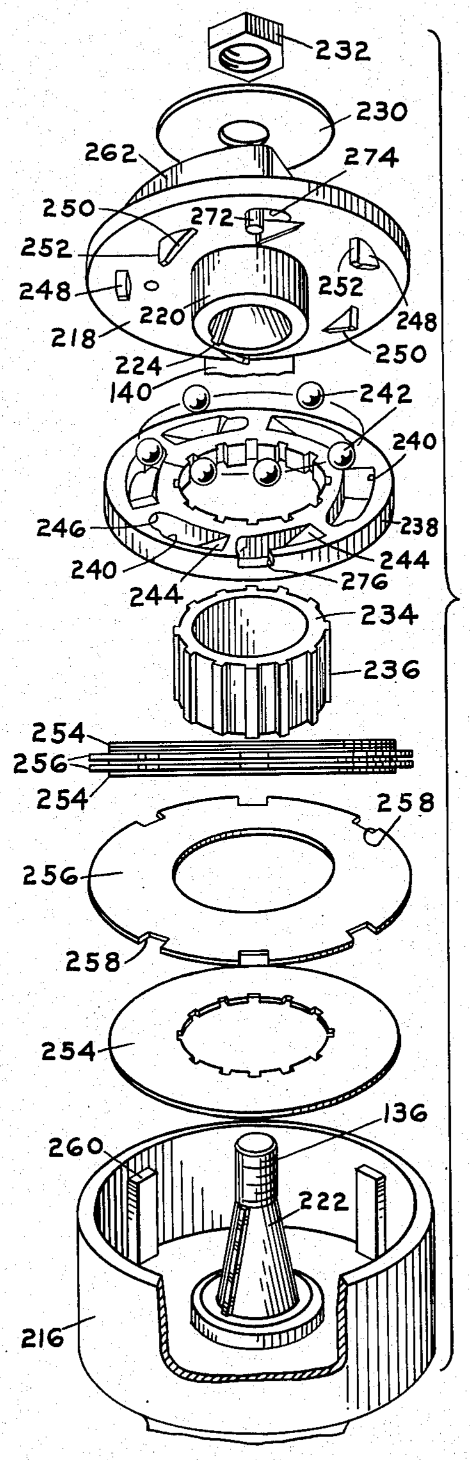
Fig. 31 is an exploded view of the brake mechanism and a portion of the crank cam shaft arranged to show the assembly thereof.

A brake drum coverplate and cam plate 218 is mounted upon the shaft 136 to rotate therewith. This coverplate is provided with a hub portion 220. This hub is provided with an axial opening which is tapered as shown in Fig. 31 and the interengaging portion of the shaft 136 is similarly tapered as shown in such figure to seat the hub. A key and key-way 222 and 224, respectively, are provided to lock this coverplate to the shaft to rotate therewith. The hub portion 220 projects on both sides of the coverplate as appears in Fig. 24. Upon the outer cylindrical projection of the hub 220 there is rotatably mounted a handle 140 as shown in Figs. 22 and 24.

The coverplate is provided with a pair of circumferentially spaced apart abutments or stops 226 and 228 projecting outwardly therefrom as shown particularly in Figs. 22 and 23. The handle 140 has a head portion which is adapted to be rotatably received over the outwardly projecting end of the hub 220 of the coverplate as shown in Fig. 22. The handle proper is adapted to be received between the stops 226 and 228 with permitted clearance for limited swing therebetween for a purpose hereinafter set forth. It is apparent that whenever the handle is brought up either against stop 226 or stop 228 that the shaft 136 will be picked up through the coverplate for rotation with the handle. It is in this manner that the rotation of the cam shaft is accomplished. The handle is held on the shaft by a plate 230 which overlaps the head of the handle as shown in Figs. 19 and 21 and is in turn held thereon by a nut 232.

Mounted within the brake drum and rotatably supported upon the inward projection of the hub 220 of the coverplate 218 is an outwardly splined hub ring 234. This ring is provided with a plurality of circumferentially spaced apart splines 236 which extend parallel to the axis of the ring. A ball retainer plate or cam ring 238 is provided with an axial opening which opening is splined to be received upon the splined ring 234 within the drum as shown in Fig. 27. This ball retainer plate is provided with a series of ball retaining recesses 240, six being here shown, note Figs. 27 and 31. These recesses are arcuate in form and are spaced apart circumferentially of the plate. A ball 242 is disposed within each recess. Each recess is provided with a sloping end face 244 and a substantially flat end face 246. The ball is adapted to be wedged upon the sloping end face as hereinafter described.

The coverplate is provided with a plurality of circumferentially spaced wedge shaped lugs 248 which project from its inner face. There is a lug for each recess, and these lugs are disposed one within each recess of the ball retaining plate. Each lug has one sloping face 250 which corresponds with the sloping face 244 of the ball retaining recess. The sloping face of the lug is adapted to urge a ball up on the sloping face 244 of the ball retaining recess to wedge the ball between said faces as hereinafter described to apply the brake. Each lug has a flat face 252 adapted to abut the flat face 246 of its ball retaining recess leaving the ball free within the recess and permitting rotation of the cam shaft from the handle free of braking resistance as hereinafter described.

Mounted within the drum are two interleaved series of brake friction discs. One series of brake friction discs is identified as 254. The discs of this series are splined to the hub 234 to rotate therewith. The other series of brake friction discs is identified as 256. The discs of this series are held to the brake drum by notches 258 formed in the peripheries of the discs which notches are engaged over splines 260 formed in the drum. The discs 256 are free from the hub 234 so as to permit rotation of the hub relative to the discs. These two series of discs are free to move axially with respect to the brake drum and the ring 234 so as to be urged axially together to furnish the braking action.

The coverplate 218 is provided on its outer face with a swingable lever 262. This lever is pivoted to the coverplate upon a pivot pin 264 carried by the plate. This lever is held in one direction of swingable motion by a spring 266. The lever is adapted to be urged in the opposite direction of swingable movement against the tension of spring 266 by a stud 270 carried by the handle 140. This lever carries a stud 272 which stud extends through a slot 274 in the coverplate. This stud 272 has permitted limited movement within the slot for a purpose hereinafter described upon swinging movement of the lever.

In the rotation of the cam shaft 136 by the handle 140 and when the handle is rotated clockwise in the direction of the arrow in Fig. 22, the handle engages the abutment 228 and picks up the coverplate 218 to rotate with the handle. Through the coverplate the shaft 136 is rotated. This is the forward direction of rotation shown by the arrows in Figs. 1 and 2. It is the direction of rotation required to rotate the pulley to advance the rope. In this direction of rotation of the flat sides 252 of the wedge lugs 248 are brought against the flat ends 246 of the recesses in the ball retainer plate and the ball retainer plate is so rotated that there is no tendency for the balls 242 to be wedged between the sloping faces 244 of the ball retainer plate and the sloping sides 250 of the wedge shaped lugs of the coverplate. In other words, the balls are free within the recesses and no wedging action results.

Assuming, however, that there is a load on the rope which is being lifted and that the rotation of the pulley by the handle is temporarily discontinued and the handle is released. It is now apparent that the weight of the load of the rope on the pulley will tend to reverse the direction of rotation of the pulley. Such reversal of direction of rotative torque applied to the pulley will tend to reverse the rotation of the coverplate 218 and will wedge the balls 242 between the sloping faces 250 of the wedge shaped lugs of the cover plate and the sloping faces 244 of the ball retainer plate. It is apparent that the rotation of the ball retainer is resisted by the drag of the interleaved discs.

Such wedging action will cause the ball retainer plate to move axially upon the splined hub ring 234 and will urge the interleaved friction discs 254 and 256 together. This wedging of the friction discs together will produce the necessary braking action to hold the pulley substantially at whatever position of rotation it reached when the handle was released. It is apparent, therefore, that in the lifting of a load the load may be elevated to any height and will be automatically held at such height so long as pressure of forward rotation is removed from the crank.

The coupling of the handle with the shaft is such that it is possible to rotate the shaft and the pulley in the forward direction as heretofore set forth. It is also possible to rotate the shaft in the reverse direction by the handle when the pulley is not under load, but the pulley does not rotate with the shaft at such time. When the pulley is under load, the handle may be reversely rotated to hold the brake off sufficiently to permit the pulley to be reversely rotated by the load, the brake slipping meanwhile, in order to permit the lowering of the load.

When the pulley is under a load and it is desired to lower such load, the handle is reversely rotated. In this direction of rotation, the head of the stud 270 will first engage the head of the lever 262. When the stud 270 contacts the lever 262 and the swing of the handle is continued, the lever is swung in the counter-clockwise direction against the tension of the spring 266. This swinging of the lever shifts the pin or stud 272 within the slot 274 of the coverplate. It will be noted that the ball retainer plate is provided with a notch or cut-out 276 opposite the slot 274 as shown in Figs. 30 and 31. The stud or pin 272 which extends through the slot 274 extends into this notch as shown in Fig. 30.

Therefore, when the handle is swung in this counter-clockwise direction, it moves first to tilt the lever 262 and the pin 272 is shifted within the slot 274 to engage one end of the notch 276 of the ball retainer plate to urge said plate to rotate with the coverplate and prevent the balls 242 from being wedged between the sloping faces 244 and 250 as hereinafter set forth. So long, therefore, as the handle is reversely rotated to hold off the brake sufficiently to permit the brake to slip under the weight of the load acting on the pulley, the load will act to reversely rotate the pulley and permit the lowering of the load.

It is apparent, of course, that if this reverse movement of rotation of the crank is discontinued and the handle is held stationary and there is a weight on the pulley tending to cause it to continue to move in this reverse direction that the brake will be automatically applied. The brake, therefore, functions at all times to automatically prevent a load from falling. The brake, however, is free at all times when the rotation of the pulley is in response to rotation of the handle.

As stated, this puller is designed to receive ropes of different diameters. The puller is light in weight and may be attached to any suitable anchorage as heretofore described in connection with the description of the anchor mechanism. Under load a proportionate part of the load may be transmitted from the anchorage to the pressure shoe assembly causing the pressure shoe mechanism to urge the rope within the V-groove of the pulley. The pulley drive is so accomplished through the rotating cams and swingable pawl arms that the pulley is under a constant torque. Whenever the drive of the pulley is stopped by discontinuance of rotation of the handle the brake will automatically go on to hold the load upon initiation of rotation of the pulley in the reverse direction under the weight of a load.

What I claim is:

1. In a rope puller, a rotatably supported pulley, a rope extending about the pulley, manually operable crank mechanism coupled with the pulley to rotate it, an anchor assembly, a pressure shoe assembly adapted to urge the rope against the pulley, said two assemblies disposed on substantially diametrically opposite sides of the pulley and coupled therewith, and tension means extending from the anchor assembly to the pressure shoe assembly and shiftable relative to the pulley to transmit load tension from the anchor assembly to the pressure shoe assembly to urge the same to hold the rope against the pulley.

2. In a rope puller, a frame, an anchor assembly at one end of the frame, a pressure shoe assembly at the opposite end of the frame, a pulley journalled upon the frame between its two ends, manually operable crank mechanism coupled with the pulley to rotate it, tension means extending between the anchor assembly and the crank mechanism, and separate relatively shiftable tension means extending between the anchor assembly and the pressure shoe assembly.

3. In a rope puller, a rotatably supported pulley, a rope extending about the pulley and otherwise disconnected from the pulley assembly, manually operable crank mechanism coupled with the pulley to rotate it, an anchor assembly coupled with the pulley, a pressure shoe assembly coupled with the anchor assembly for shiftable response to the load thereon to urge the rope against the pulley with a force proportioned to the load on the pulley.

4. In a rope puller, a frame, a rotatably supported pulley carried by the frame, a rope extending about the pulley, manually operable crank mechanism coupled with the pulley to rotate it, an anchor assembly at one end of the frame, a pressure shoe assembly at the opposite end of the frame operable to urge the rope against the pulley, tension means extending from the anchor assembly to the pressure shoe mechanism shiftable relative to the frame to urge the pressure shoe to hold the rope toward the pulley with a force proportioned to the load on the anchor assembly.

5. In a rope puller, a rotatably supported pulley, a pair of pawls supported to be moved into and out of engagement with the pulley, each pawl being reciprocably supported for shiftable movement to drive the pulley through a given arc of rotation and to be returned relative to the pulley to its starting position, rotatable crank mechanism, means coupling the crank mechanism with the pawls to shift the pawls individually to rotate the pulley, and means coupled with the crank mechanism controlling the engagement of the pawls with the pulley.

6. In a rope puller, a rotatably supported pulley, a pair of pawls supported to be moved into and out of engagement with the pulley, each pawl being reciprocably supported for shiftable movement to drive the pulley through a given arc of rotation and to be returned relative to the pulley to its starting position, rotatable crank mechanism, means coupling the crank mechanism with the pawls to shift the pawls individually to rotate the pulley, and means coupled with the crank mechanism operable thereby to move the pawls out of driving engagement with the pulley.

7. In a rope puller, a rotatably supported pulley, a pair of pawls supported on opposite sides of the pulley to be moved into and out of driving engagement therewith, each pawl being pivotally supported for swingable movement through an arc of rotation of the pulley and for swingable movement of return of the pawl relative to the pulley to the starting position of the pawl, rotatable crank mechanism including a crank shaft provided with a pair of cams adapted upon rotation of the shaft to actuate said pawls successively to rotatably drive the pulley, said crank mechanism including other cams disposed to actuate said pawls successively controlling their driving engagement with the pulley.

8. In a rope puller, a rotatably supported pulley, a pair of pawls rotatably supported upon opposite sides of the pulley for swingable movement about the axis of the pulley, each pawl supported to be moved into and out of driving engagement with the pulley and adapted to be swung about the axis of the pulley in either the "in" or "out" position, crank mechanism including a cam shaft provided with a pair of cams adapted upon rotation of the shaft to actuate said pawls successively to rotate the pulley, said crank mechanism including a second pair of cams disposed to actuate said pawls successively to move them into and out of engagement with the pulley.

9. In a rope puller, a rotatably supported pulley provided with hub extensions on both sides, a pair of pawls rotatably supported upon opposite sides of the pulley upon said hub extensions for swingable movement, each pawl also supported to be moved into and out of driving engagement with the pulley, crank mechanism including a cam shaft provided with a pair of cams adapted to actuate said pawls successively upon rotation of the shaft, said crank mechanism including a second pair of cams adapted upon rotation of the shaft to actuate said pawls successively in a direction normal to their direction of actuation by the first mentioned pair of cams.

10. In a rope puller, a rotatably supported pulley provided on opposite sides with a series of circumferentially arranged ratchet teeth, a pair of pawl arms supported upon oppostie sides of the pulley for swingable rotation, a pawl carried by each arm and shiftable into and out of engagement with the ratchet teeth of the pulley, crank mechanism including a crank shaft provided with a pair of cams disposed to actuate said arms successively to swing through a given arc of rotation of the pulley, pawl actuating means associated with the crank mechanism operable to move the pawls into and out of driving engagement with the ratchet teeth in the pulley.

11. In a rope puller, a rotatably supported pulley provided on opposite sides with a series of circumferentially arranged ratchet teeth, a pair of pawl arms supported upon opposite sides of the pulley for swingable rotation, a pawl carried by each arm and shiftable into and out of engagement with the ratchet teeth of the pulley, crank mechanism including a crank shaft provided with a pair of cams disposed to actuate said arms successively to swing through a given arc of rotation of the pulley, said crank mechanism including a second pair of cams adapted upon rotation of the shaft to actuate the pawls with respect to engagement with the pulley.

12. In a rope puller, a frame, an anchor assembly supported on one end of the frame, a pressure shoe assembly supported on the opposite end of the frame, a pulley journalled on the frame between said two ends, said pulley provided on opposite sides with a series of circumferentially arranged ratchet teeth, a pair of pawl arms supported on opposite sides of the pulley for reciprocating swinging movement about the pulley axis, a pawl carried by each arm and shiftable into and out of engagement with the ratchet teeth of the pulley, crank mechanism including a crank shaft coupled by tension linkage with the anchor assembly, said cam shaft provided with cams adapted upon rotation of the shaft to successively swing the pawl arms to drive the pulley, said crank mechanism including two additional cams disposed to successively move the pawls into and out of engagement with the pulley, a rope extending about the pulley, pressure shoe mechanism operable to hold the rope against the pulley, tension linkage connecting the anchor assembly with the pressure shoe mechanism to hold the rope against the pulley and brake mechanism operable to automatically maintain the pulley at any position of rotation.

13. In power mechanism, a driven member provided with a linear succession of ratchet teeth, a pair of pawls supported to be moved into and out of engagement with said teeth, each pawl supported to be shifted to actuate said member when in engagement with the teeth rotatable crank mechanism, means coupling the crank mechanism with the pawls to shift the pawls individually to advance the driven member, and means coupled with the crank mechanism controlling the engagement of the pawls with the teeth of the driven member.

14. In power mechanism, a driven member provided with an linear succession of ratchet teeth, a pair of pawls supported to be moved into and out of engagement with said teeth, each pawl supported to be shifted to actuate said member when in engagement with the teeth, pawl actuating mechanism including a cam shaft provided with a pair of cams adapted upon rotation of the shaft to actuate the pawls to drive the member, said pawl actuating mechanism including a second pair of cams coordinated in movement with the first pair of cams and adapted to move the pawls successively to control their engagement with the driven member.

15. In a rope puller, a pulley journalled for rotation, a manually rotatable crank mounted at one side of the pulley and coupled therewith to rotate the same, anchor mechanism coupled with the pulley, said anchor mechanism including two swivelled together parts, one part connected with the pulley against swivelling and a second part adapted for attachment to an anchorage, each part including a friction surface adapted to swivel with the part, said two friction surfaces disposed in abutting engagement and adapted to be urged together when load is taken through the anchor mechanism from the pulley to frictionally resist swiveling of the pulley with respect to the anchor at any position of the pulley with respect to the anchor.

16. In a rope puller provided with a rotatable pulley, anchor mechanism coupled therewith, said anchor mechanism including a stud connected with the pulley, a yoke swivelled on the stud for rotation about the axis thereof, a pair of friction plates disposed in abutting relationship upon the stud within the yoke, one of said plates being coupled with the yoke to rotate therewith relative to the stud, the other plate being coupled with the stud to rotate therewith relative to the yoke, anchor attachment means connected with the yoke, the load of the pulley being transmitted through the stud and through said friction plates and yoke to the attachment means connected with the yoke.

17. In a rope puller, a frame, a V-groove pulley rotatably supported upon the frame, means coupled with the pulley to rotate the same, a rope extending about the pulley, an anchor attachment coupled with the pulley frame to take the load on the pulley, pressure shoe mechanism supported upon the frame operable to urge the rope into the V-groove, tension means extending between the anchor attachment and the pressure shoe mechanism shiftable relative to the frame to transmit pulley load from the anchor mechanism to the pressure shoe mechanism to urge the pressure shoe against the rope in the pulley groove.

18. In a rope puller, a frame, a pulley rotatably supported upon the frame, means coupled with the pulley to rotate the pulley, a rope extending about the pulley, an anchor attachment coupled with the frame to take the load of the pulley, pressure shoe mechanism supported on the frame comprising a plurality of rigid pressure elements pivotally connected together forming flexible pressure means adapted to be urged against an arcuate portion of the rope to hold it against the pulley and mechanism operably connected with the frame responsive to the load on the pulley to urge said pressure elements against the rope to hold the rope against the pulley.

19. In a rope puller, a frame, a pulley rotatably supported upon the frame, means coupled with the pulley to rotate the pulley, a rope extending about the pulley, an anchor attachment coupled with the frame to take the load thereof, pressure shoe mechanism supported upon the frame comprising a plurality of rigid arcuate shoes pivotally linked together forming flexible pressure means and rollers supported to urge the shoes individually against an arcuate portion of the rope to hold it against the pulley, and means responsive to pressure imposed upon the pulley to urge said rollers against the shoes to urge the rope against the pulley.

20. In a rope puller, a frame, a pulley rotatably supported upon the frame, means coupled with the pulley to rotate the pulley, a rope extending about the pulley, an anchor attachment coupled with the frame to take the load thereof, pressure shoe mechanism supported on the frame comprising a plurality of arcuate rigid pressure shoes linked together forming an endless chain supported upon a series of rollers to travel thereover and adapted to bear against an arcuate portion of the rope to hold it against the pulley, tension means coupling the rollers with the anchor attachment to respond to load imposed thereon from the pulley to hold the rollers to urge the pressure shoes against the rope holding the rope against the pulley.

PHILIP S. ARNOLD.

REFERENCES CITED

The following references are of record in the file of this patent:

UNITED STATES PATENTS

| Number | Name | Date |
|---|---|---|
| 24,967 | Wilcoxson | Aug. 2, 1859 |
| 268,068 | Wythe | Nov. 28, 1882 |
| 554,890 | Meier | Feb. 18, 1896 |
| 972,451 | Israel | Oct. 11, 1910 |
| 1,157,299 | Davies et al. | Oct. 19, 1915 |
| 1,580,411 | Coffing | Apr. 13, 1926 |
| 1,682,083 | Johnston | Aug. 28, 1928 |
| 1,685,015 | Aycock | Sept. 18, 1928 |
| 1,795,058 | Townsend | Mar. 3, 1931 |
| 1,862,331 | Coffing | June 7, 1932 |
| 1,931,860 | Cherry | Oct. 24, 1933 |
| 2,240,814 | Taylor | May 6, 1941 |

FOREIGN PATENTS

| Number | Country | Date |
|---|---|---|
| 549,510 | France | Feb. 12, 1923 |